(12) United States Patent
Vemparala et al.

(10) Patent No.: US 8,645,994 B2
(45) Date of Patent: Feb. 4, 2014

(54) BRAND DETECTION IN AUDIOVISUAL MEDIA

(75) Inventors: Praveen Kumar Vemparala, Redmond, WA (US); Michael G. Lucero, Bellevue, WA (US); Richard D. Prologo, Sammamish, WA (US); Jason S. White, Brooklyn, NY (US); David S. Alles, Seattle, WA (US); Enrique de la Garza, Sammamish, WA (US); Virginia M. Musante, Mercer Island, WA (US); Eitan Sharon, Palo Alto, CA (US); Saleel Sathe, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/536,304

(22) Filed: Jun. 28, 2012

(65) Prior Publication Data

US 2014/0007155 A1    Jan. 2, 2014

(51) Int. Cl.
*H04N 7/025* (2006.01)

(52) U.S. Cl.
USPC .............................. 725/36; 709/221

(58) Field of Classification Search
USPC ................ 725/34–36, 60, 61, 93, 116; 709/217–232
See application file for complete search history.

(56) References Cited

U.S. PATENT DOCUMENTS

| | | | |
|---|---|---|---|
| 4,486,775 A | 12/1984 | Catlow | |
| 7,493,636 B2 * | 2/2009 | Kitsukawa et al. | 725/23 |
| 7,996,551 B2 * | 8/2011 | Brackx et al. | 709/231 |
| 2006/0236342 A1 | 10/2006 | Kunkel et al. | |
| 2008/0263583 A1 | 10/2008 | Heath | |
| 2009/0077580 A1 | 3/2009 | Konig et al. | |
| 2010/0054537 A1 | 3/2010 | Bateman | |
| 2010/0257550 A1 | 10/2010 | Slothouber et al. | |
| 2011/0321109 A1 | 12/2011 | Hudson et al. | |
| 2012/0078894 A1 | 3/2012 | Jiang et al. | |

OTHER PUBLICATIONS

"A Digital Video Advertising Overview", Retrieved at <<http://www.iab.net/media/file/dv-report-v3.pdf>>, Jan. 2008, pp. 1-14.
"Digital Fingerprinting & Video Content Recognition Enabling New Forms of Interactive", Retrieved at <<http://www.audiblemagic.com/white-papers/Digital_Fingerprinting_Enables_New_Forms_of_Interactive_Advertising.pdf>>, Jun. 7, 2011, pp. 1-9.

* cited by examiner

*Primary Examiner* — Annan Shang
(74) *Attorney, Agent, or Firm* — Micah Goldsmith; Glen Johnson; Micky Minhas

(57) ABSTRACT

This document describes techniques and apparatuses enabling brand detection in audiovisual media. The techniques detect a brand exposed within audiovisual media, such as a name or logo for a product or service, and based on this brand, present a brand advertisement or enable selection of an interactive experience that is associated with the brand. By so doing, marketers enable viewers to quickly and easily learn more about the product or service.

20 Claims, 9 Drawing Sheets

PACKARD

BRAND DETECTION IN AUDIOVISUAL MEDIA

BACKGROUND

Many audiovisual media programs, such as television and movies, expose products and services to viewers. A comedy program, for example, may include a scene showing a cleaning service named "Happy Helpers." A movie may include a car chase prominently displaying two sports cars made by well-known manufacturers.

If a viewer wishes to learn more about the cleaning service or one of the sports cars he or she may pause the program or wait until the program is over and then research the service or car. The viewer, however, may not wish to pause the program (or be unable to pause it) or may forget the name of the car or service prior to researching them. And, even if the viewer does not mind pausing the program or remembers the name, performing the search can be time-consuming or fail to provide the desired information.

Furthermore, many marketers of products and services wish to provide opportunities for viewers to learn more about products and services exposed during audiovisual media. Many current methods, however, enable marketers to present advertisements related to a product or service within an audiovisual program only if these marketers make arrangements with a local or national provider of the program many weeks or months prior to the program being presented. In many other cases marketers are simply unable to present advertisements related to a product or service within a program due to being unaware that the product or service will be exposed.

SUMMARY

This document describes techniques and apparatuses enabling brand detection in audiovisual media. The techniques detect a brand exposed within audiovisual media, such as a name or logo for a product or service, and based on this brand, present a brand advertisement or enable selection of an interactive experience that is associated with the brand. By so doing, marketers enable viewers to quickly and easily learn more about the product or service.

This summary is provided to introduce simplified concepts for brand detection in audiovisual media, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses enabling brand detection in audiovisual media are described with reference to the following drawings. The same numbers are used throughout the drawings to reference like features and components.

DETAILED DESCRIPTION

Overview

This document describes techniques and apparatuses enabling brand detection in audiovisual media. The techniques detect a brand exposed within audiovisual media, such as a name or logo for a product or service, and based on this brand, present a brand advertisement or enable selection of an interactive experience that is associated with the brand. By so doing, marketers enable viewers to quickly and easily learn more about the product or service.

Consider, for example, the comedy program mentioned above. Assume that the comedy program includes four advertisements and space for eight more advertisements that are not yet included. The techniques can detect the "Happy Helpers" cleaning-service brand within the comedy and then determine which advertisement to present within one of those eight spaces. The advertisement can be directed to the same brand of cleaning service or some other cleaning service. Furthermore, the techniques may also enable a viewer to select an interactive experience to learn more about the "Happy Helpers" cleaning service or the other cleaning service, such as through a selectable control presented within the advertisement.

These techniques can be used well in advance of presenting an advertisement or enabling an interactive experience based on the detected brand, though techniques may not require advance preparation. Instead, the techniques may operate nearly instantaneously on audiovisual media broadcast to a computing device or through a media provider just prior to broadcasting the audiovisual media.

This is but one example of how techniques and/or apparatuses enabling brand detection in audiovisual media can be performed. Techniques and/or apparatuses that enable brand detection in audiovisual media are referred to herein separately or in conjunction as the "techniques" as permitted by the context. This document now turns to an example environment in which the techniques can be embodied, followed by various example methods for performing the techniques, after which an example device in which the techniques may be embodied is described.

Example Environment

Figure 1:
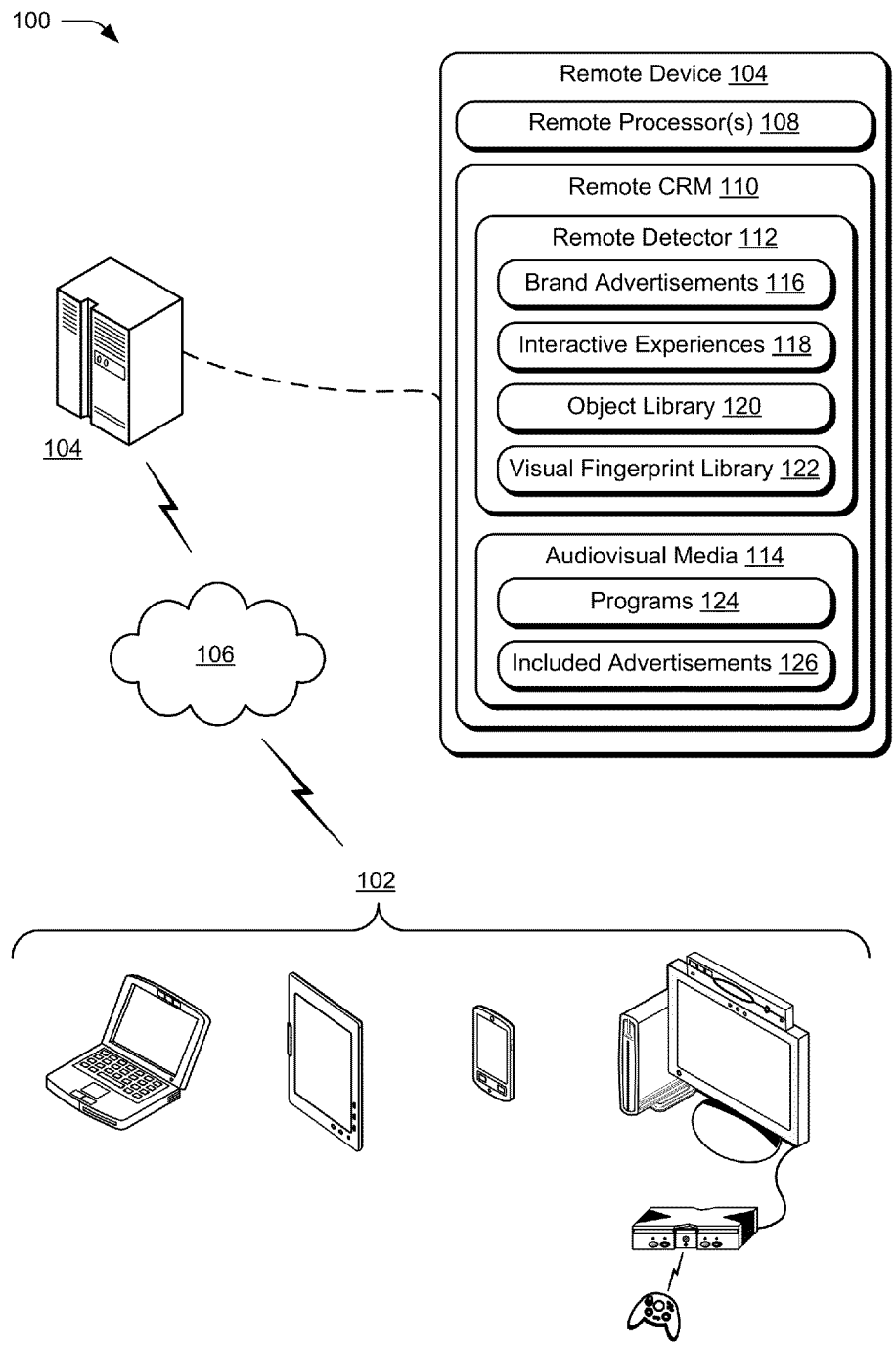
FIG. 1 illustrates an example environment in which techniques enabling brand detection in audiovisual media can be implemented.

FIG. 1 is an illustration of an example environment 100 in which techniques for brand detection in audiovisual media can be embodied. Environment 100 includes a presentation device 102, a remote device 104, and a communications network 106. The techniques can be performed and the apparatuses embodied, in whole or in part, by one or both of presentation device 102 and remote device 104 as will be described below.

Generally, presentation device 102 presents audiovisual media, such as programs and advertisements, to an audience having one or more users. Remote device 104 provides the programs, and in some cases also advertisements, interactive experiences, and other media, through communication network 106. These programs can be broadcast through radio (e.g., UHF, VHF), satellite, a wireless local area network (WLAN), or cable, to name a few. Programs, when broadcast, are generally provided at a scheduled time. Programs may also be provided in a liner fashion and intended to be presented as received or nearly immediately to being provided, though the programs may be stored prior to presentation, such as in memory of a digital video recorder of a set-top box or gaming system.

Broadcast of the programs is not required, however. Programs can be provided as streaming media, on physical media (e.g., a DVD or Blu-ray disk), or downloaded for later presentation. When provided in a form other than physical media, communication network 106 enables communication of the programs.

In more detail, the example remote device 104 of FIG. 1 includes or has access to one or more remote processors 108 and remote computer-readable storage media ("CRM") 110. Remote CRM 110 includes a remote detector 112 and audiovisual media 114. Remote detector 112 includes, or has access to, brand advertisements 116, interactive experiences 118, object library 120, and visual fingerprint library 122.

Brand advertisements 116 are advertisements associated with a brand. This brand may be one detected in audiovisual media or may be related to a detected brand, such as presenting an advertisement for a different brand of cleaning service when the "Happy Helpers" brand is detected.

Interactive experiences 118 are associated with a brand and enable interaction with a viewer. Examples include software presenting a graphical user interface that provides information about a brand, such as a particular sports car, and that enables selection to see additional details about the car's engine, its sound with revved, videos showing it being driven at an auto race or through the countryside, colors and options available, awards that the car has won, and so forth.

Object library 120 includes visual or audio objects usable to detect brands within audiovisual media. These visual or audio objects may include, for example, various trademarks, logos, jingles, the printed or spoken name of the brand, and so forth. Assume, for example, that a car manufacturer named "Packard Automobile Company" builds a car named "Blue Flight Model 400." Logos, trademarks, and so forth for the company and the car model can be stored in object library 120, including forms of these, such as in various different lighting and angles that may show up in audiovisual media. Songs or jingles associated with the company and car, the text "Packard," and the spoken word "Packard," as well as "Blue Flight" or "Model 400" can be stored.

Visual fingerprint library 122 includes data of, or metadata about, audiovisual media. These fingerprints can be visual or audio portions of audiovisual media found to be associated with a brand, such as a brand detected in a prior presentation of an advertisement. These fingerprints can be aspects more easily or quickly detected by the techniques than object recognition readily permits or be used in conjunction with object recognition.

Audiovisual media 114 includes programs 124 and included advertisements 126. Programs 124 include numerous types of content enjoyed by users, such as music videos, images, video shorts, television programs, movies, and video games, to name a few. Audiovisual media 114 may include included advertisements 126, which can be explicit or implicit sales or information vehicles. Examples include commercials, whether included within a program, presented at the beginning of the program, or presented at the end of the program. Included advertisements 126 are generally included with program 124, such as when an advertisement is presented prior to presenting a video short on a computing device or within a television show presented on a television. The techniques may detect a brand within an included advertisement and then enable an interactive experience associated with the brand or determine to present another advertisement associated with that brand (e.g., brand advertisement 116).

Figure 2:
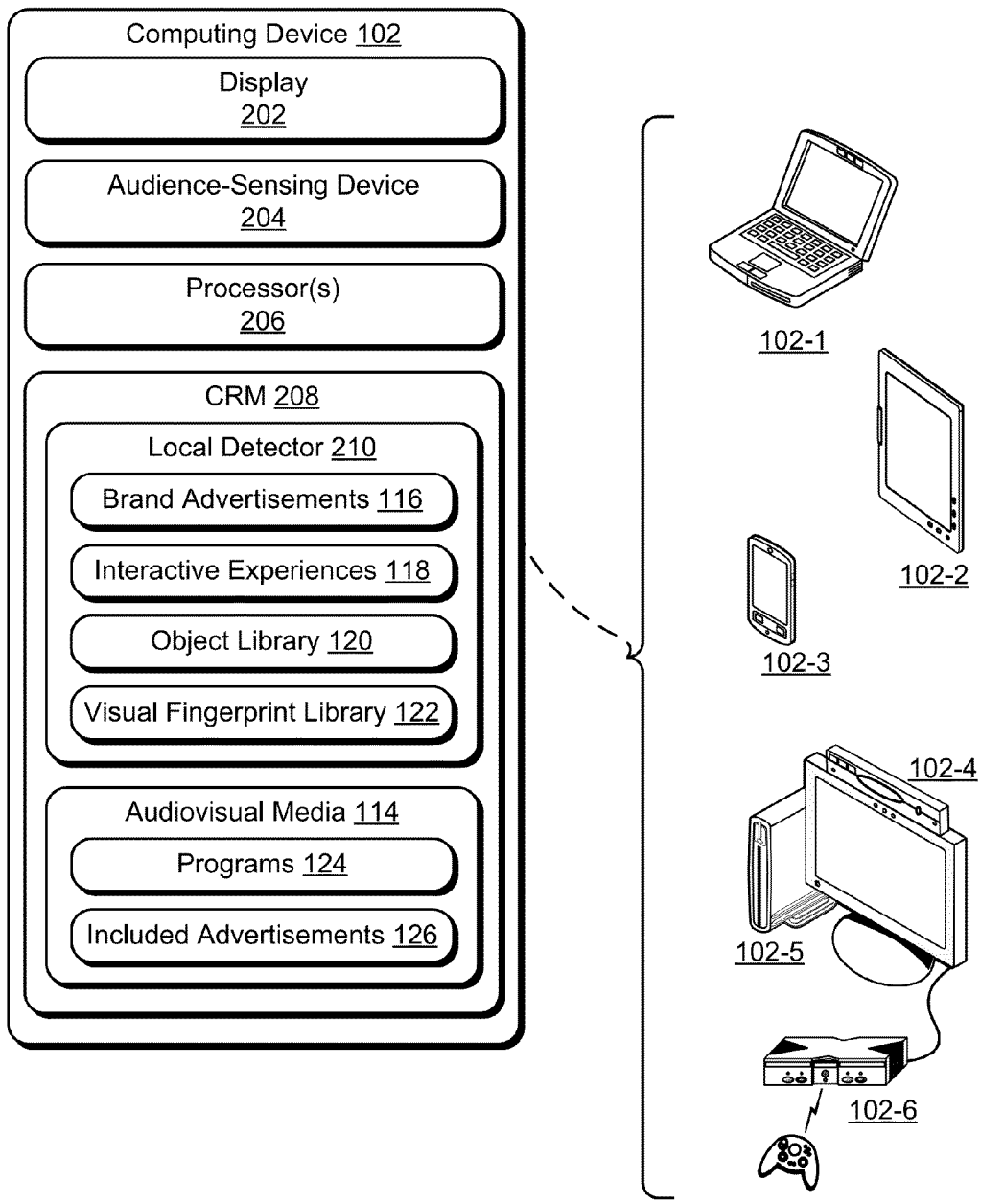
FIG. 2 is an illustration of an example computing device of FIG. 1.

With regard to the example computing device 102 of FIG. 1, consider a detailed illustration in FIG. 2. Computing device 102 can each be one or a combination of various devices, here illustrated with six examples: a laptop computer 102-1, a tablet computer 102-2, a smartphone 102-3, a set-top box 102-4, a desktop 102-5, and a gaming system 102-6, though other computing devices and systems, such as televisions with (or without) computing capabilities, netbooks, and cellular phones, may also be used. As will be noted in greater detail below, in some embodiments the techniques operate through remote device 104. In such cases, computing device 102 may forgo performing computing operations relating to the techniques, and thus need not be capable of computing operations.

Computing device 102 includes or is able to communicate with a display 202 (four are shown in FIG. 2), an audience-sensing device 204, one or more processors 206, and computer-readable storage media 208 (CRM 208). CRM 208 includes a local detector 210 and audiovisual media 114. Local detector 210 includes, or has access to, brand advertisements 116, interactive experiences 118, object library 120, and visual fingerprint library 122. Audience-sensing device 204 enables selections to be received from a user watching audiovisual media 114, such as remote control receiver, motion or heat-sensing camera, audio-command receiver, keyboard, mouse, touch-sensitive aspect of one of displays 202 by which to receive gestures, and so forth.

Audiovisual media 114 includes programs 124 and included advertisements 126 similarly to as set forth for remote device 104 of FIG. 1. As described below, however, the techniques may operate local to the computing device associated with a display, and thus detect brands. Audiovisual media 114 can be stored or presented as received, depending on the setup of computing device 102.

These and other capabilities, as well as ways in which entities of FIGS. 1 and 2 act and interact, are set forth in greater detail below. These entities may be further divided, combined, and so on. The environment 100 of FIG. 1 and the detailed illustration of FIG. 2 illustrate some of many possible environments capable of employing the described techniques.

Example Methods

Figure 3:
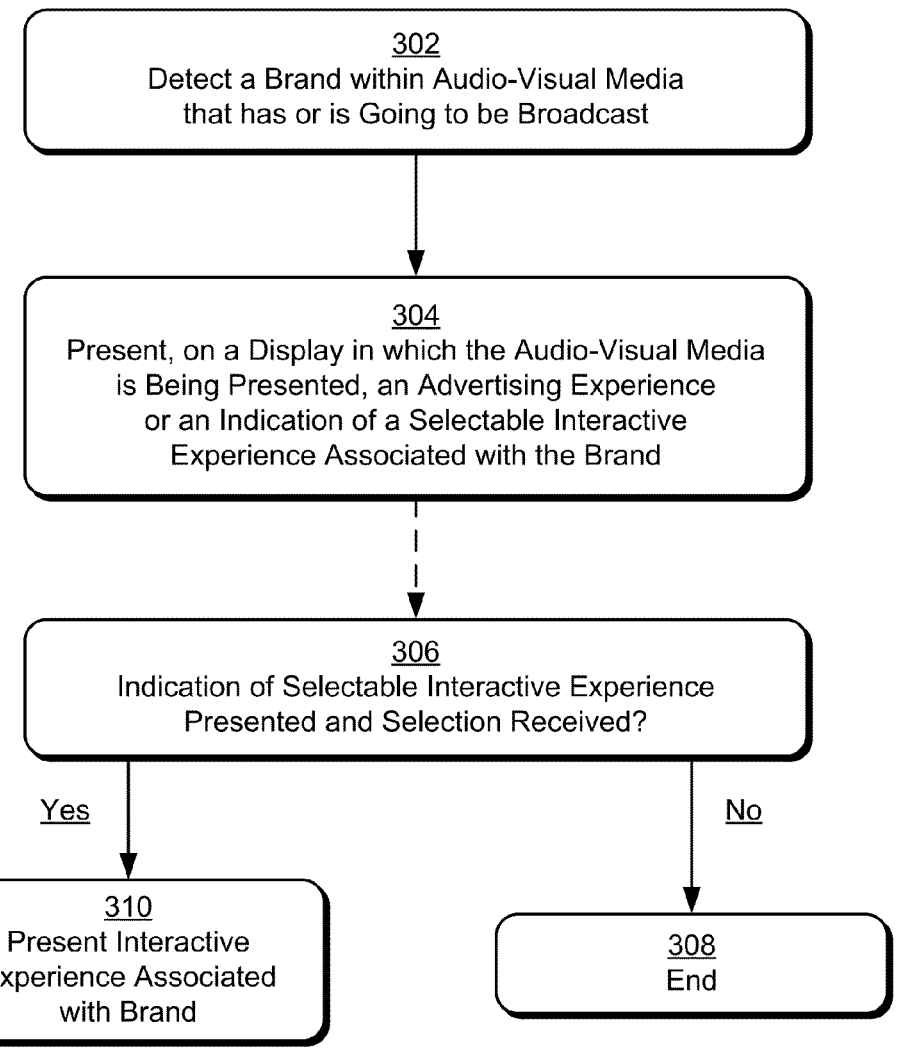
FIG. 3 illustrates example methods for brand detection in audiovisual media, including for media that is or is about to be broadcast.

FIG. 3 depicts example methods 300 for brand detection in audiovisual media, including for media that is or is about to be broadcast. These and other methods described herein are shown as sets of blocks that specify operations performed but are not necessarily limited to the order shown for performing the operations by the respective blocks. In portions of the following discussion reference may be made to environment 100 of FIG. 1 and entities detailed in FIGS. 1 and 2, reference to which is made for example only. The techniques are not limited to performance by one entity or multiple entities operating on one device.

Block 302 detects a brand within audiovisual media that has or is going to be broadcast. Block 302 may be performed remote from a display on which the media is presented, such as at remote device 104, or local to the display, such as at computing device 102. For the remote case, assume that remote detector 112 of remote device 104 receives audiovisual media 114 from another entity prior to broadcasting audiovisual media 114 from remote device 104 and to computing device 102.

For the local case, assume that local detector 210 of computing device 102 of FIG. 2 receives audiovisual media 114 through a broadcast, such as through radio, cable, or satellite. Local detector 210 may detect the brand in real-time as the media is rendered on display 202, just prior to rendering, or just after rendering (e.g., within a few seconds).

In either case, the techniques detect a brand in audiovisual media at block 302. Detecting may be performed by visual or audio object recognition or by recognizing a fingerprint. For object recognition, remote detector 112 and/or local detector 210 (herein "detector") compares audio or visual aspects of audiovisual media 114 against objects in object library 120. This can be performed by comparing a portion of a single frame or multiple frames of audiovisual media 114.

Figure 4:
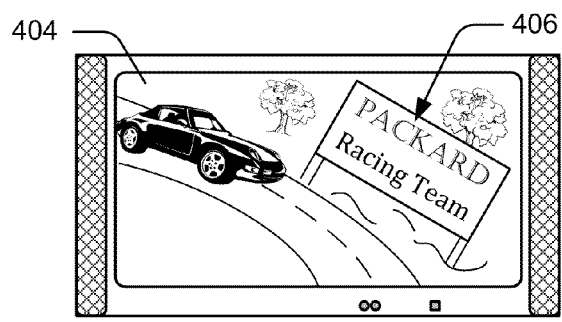
FIG. 4 illustrates an example object within an object library and visual aspects of an audiovisual media program.
Figure 4:
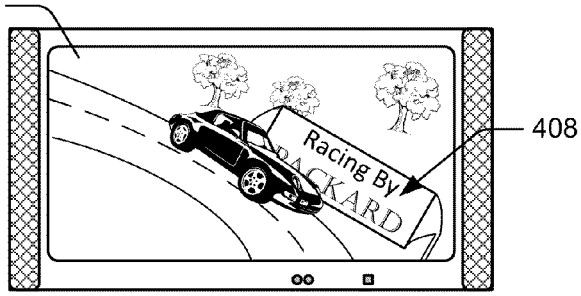
Figure 4:
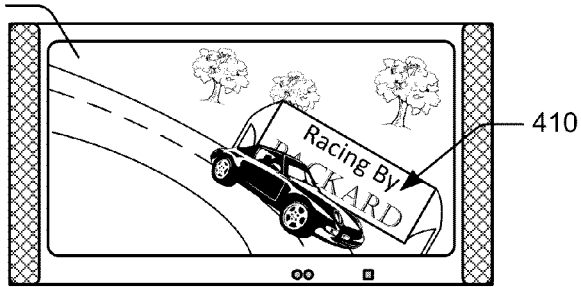
Figure 4:
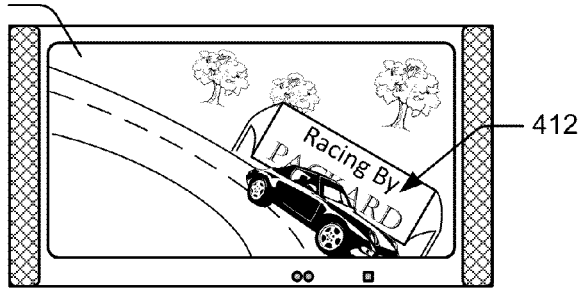

By way of example, consider FIG. 4, which illustrates an object 402 within object library 120 of FIG. 1. Object 402 is a brand made up of a text-based logo (the name of the company) in a particular font. Assume that audiovisual media 114 includes a car-racing program. This car-racing program has signs and banners for the program's sponsors within the race. In a first case, assume that the program shows, in frame 404 of the program, an un-obscured visual aspect 406. As can be seen, this visual aspect looks like object 402 but at an angle. The detector is capable of adjusting visual aspects, such as partial obscurities, angles, colors, shading, and the like against objects, or accounting for these differences, sufficient to determine that they are similar. In this case the detector determines from a single frame of the program, based on comparing object 402 and un-obscured visual aspect 406, that visual aspect 406 is the brand shown in object 402 using this frame 404.

In some cases, however, multiple frames (frames meaning different images over time, though media may not be made up of actual frames) are used by the detector. Consider again the "Packard" example. In this case, however, the visual aspect of interest is obscured within first, second, and third frames. Assume that each visual aspect is too obscured to be recognized as the "Packard" brand. By way of illustration, consider partially obscured visual aspects 408, 410, and 412 (aspects 408, 410, and 412) of frames 414, 416, and 418, respectively. Note here that aspects 408, 410, and 412 are all obscured by a car. By preforming object recognition on multiple, partially obscured visual aspects, the detector can better determine if a brand is exposed in the media, such as by building an aggregate of each of the aspects. Here most of the obscured "PA" of aspect 408 is filled in by the detector with the "P" and most of the "A" of aspect 412 or vice-a-versa with the "KA" of aspect 412 with portions of aspects 410 and 408. The aggregate of these aspects would then look very much like un-obscured visual aspect 406.

In some cases, the detector performs object recognition by first determining that some of the visual aspects have a low probability of being associated with objects of object library 120, forgoes comparing these visual aspects with the objects, and then analyzes remaining visual aspects against the objects of object library 120. This can improve speed or accuracy of object recognition in some cases by quickly reducing the number of aspects of a frame that are compared to objects associated with brands. Thus, for a frame having visual aspects showing trees, a river, a road, whitespace, a blue sky, black space, and a billboard, the visual aspects showing the trees, the river, the road, the whitespace, the blue sky, and the black space can be quickly excluded from object recognition. The visual aspect showing text on the billboard, however, may be compared with objects of object library 120.

Furthermore, and as noted in part above, object recognition need not be limited to logos and trademarks associated with a brand. In some cases, audio aspects or even facial recognition can be used, such as with speech or an image of a person associated with a brand. Many audio aspects can also be used to aid in detecting a brand. Voice recognition, for example, can be used when a person speaking in audio-visual media says "I love my Packard" or "I was so tired I called Happy Helpers to clean up." Audio aspects can also be used by the detector, such as a song or jingle associated with a brand.

Note also that block 302, as part of detecting the brand, may determine that the brand is within an advertisement associated with the brand. In such a case the detector may present another advertisement later in the program to emphasize the brand or may forgo presenting another advertisement associated with the brand and instead present an indication of a selectable interactive experience within the advertisement. Thus, assume that the methods detect the "Happy Helpers" brand within a "Happy Helpers" advertisement. The methods may then indicate within the advertisement that a selectable interactive experience is available.

Determining that the audiovisual media is an advertisement rather than a program can be through various manners, such as volume changes from prior frames, audio aspects or quality differences from recent portions of audio, lack of a channel logo in a portion of the audiovisual media where one recently existed, resolution changes, and so forth. Detection of a fingerprint may also be used, which is described elsewhere herein.

Block 304 presents or causes presentation of, on a display in which the audiovisual media is being presented, an advertisement associated with the brand or an indication of a selectable interactive experience associated with the brand. For the ongoing example illustrated in FIG. 4, the detector detects the Packard brand and, responsive to this detection, presents an advertisement for Packard or an indication of a selectable interactive experience associated with Packard (or both). In the case of an advertisement, the detector locates one of brand advertisements 116 and presents it at some point during the program. In the case of an interactive experience, the detector presents an indicator that a selectable interactive experience is available for Packard.

In the case of a brand advertisement being presented, consider a different example program, such as a made-for-television movie that includes a famous actor named Bill Thomas. Assume that the program does not expose a particular brand for which Bill Thomas is a frequent spokesman. In such a case, the detector may recognize the actor, his association with the particular brand, and later select an advertisement or interactive experience that uses Bill Thomas as the spokesman rather than some other spokesman. This is but one example of the ways in which the techniques may not only discover a brand but may tailor ads or experiences to the experience of the user during the program.

Alternatively or in addition to presenting an advertisement associated with the brand, methods 300 may present an indication of a selectable interactive experience associated with the brand. In such a case, methods 300 proceed to block 306.

Block 306 presents the indication. If selection of the interactive experience is not received, methods 300 proceed along the "No" path to block 308, at which point methods 300 end. If, however, selection is received, methods 300 proceed along the "Yes" path to block 310.

Block 310 presents an interactive experience associated with the brand. As noted herein, the selection may be received through a computing device associated with presentation of the audiovisual media, such as computing device 102, though this is not required. An indication may instead be presented on a different device associated with the display device or a user associated with the display device. For example, assume that remote detector 112 detects a brand in audiovisual media 114, which is then broadcast to, and presented through, a television display. Remote detector 112 may also cause the indication or experience to be presented through a computing device not displaying audiovisual media 114 but associated with a viewer of the television, such as by transmitting the indication to smartphone 102-3 of FIG. 2. The selection may be received through smartphone 102-3, which then presents the one of interactive experiences 118 that is associated with the brand.

Figure 5:
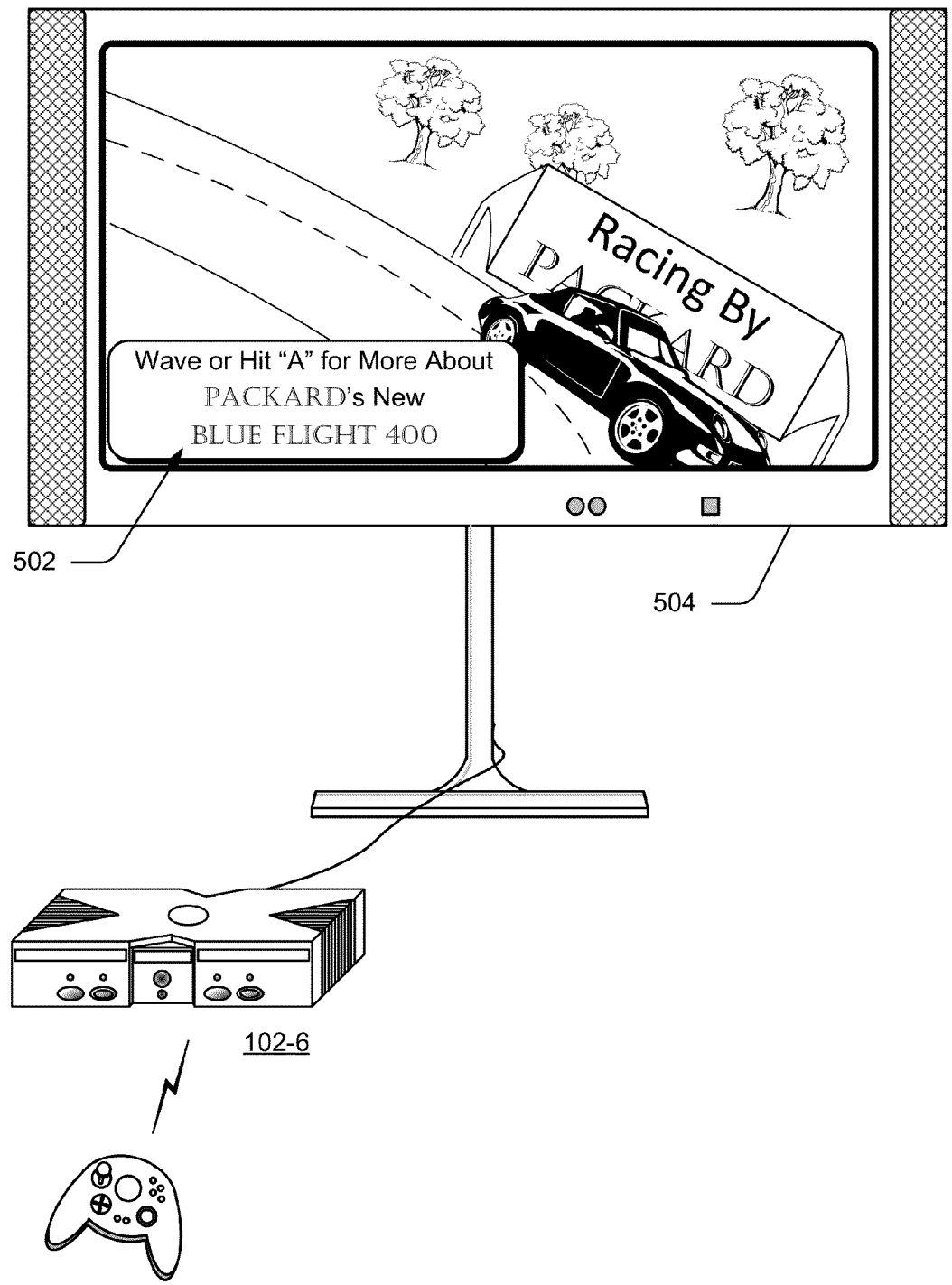
FIG. 5 illustrates an example indication that is selectable by a viewer of a program.

Concluding the Packard example set forth above, assume that the detector presents an indication that an interactive experience can be selected. FIG. 5 illustrates an example indication 502 that is selectable by a viewer of the program during the presentation of the racing program in which the Packard brand is detected. The detector presents indication 502 through the device on which the racing program is displayed. Here assume that gaming system 102-6 of FIG. 2 indicates, on display 504, that selection can be made through a gaming controller button "A" or a hand wave sensed by a motion-sensing camera.

Figure 6:
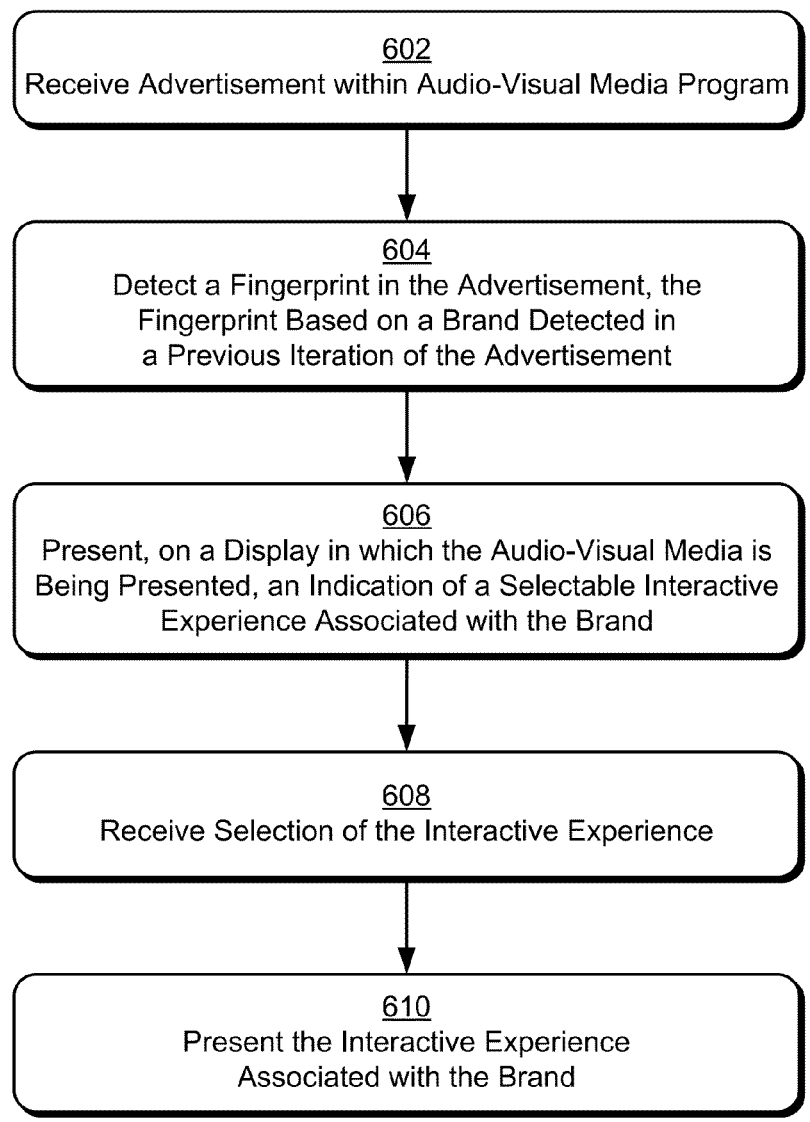
FIG. 6 illustrates example methods for brand detection in audiovisual media, including through detecting a fingerprint in an advertisement.

FIG. 6 depicts example methods 600 for brand detection in audiovisual media, including through detecting a fingerprint in an advertisement. Methods 600 are not limited to broadcast media; the advertisement can be received within the audiovisual media program as the media is being broadcast, via streaming, or from storage.

Block 602 receives an advertisement within an audiovisual media program. As noted in part above, an advertisement can be included within audiovisual media, such as at a beginning, middle, or end of the program, including presented as a requirement to displaying the program.

Block 604 detects a visual fingerprint in the advertisement, the visual fingerprint based on a brand detected within a previous iteration of the advertisement. This previous iteration of the advertisement can be a prior presentation of the advertisement, whether during a different media program or the same program. The detector, when performing blocks of methods 300 for example, may detect in a prior presentation of the advertisement a brand and on detection, record a visual fingerprint for later use. This previous iteration may also be performed irrespective of a prior presentation, such as part of a screening of advertisements projected to be displayed during programs. In either case, the visual fingerprint can be determined by the detector, such as remote detector 112, and then stored for future use in visual fingerprint library 122.

Block 604 may detect the visual fingerprint in various manners, such as by comparing metadata of an advertisement with metadata of visual fingerprint library 122. In other cases, visual aspects of the advertisement are compared with visual aspects stored in visual fingerprint library 122. In both cases, the data in visual fingerprint library 122 is associated with brands. This association can indicate associated interactive experiences, such by including a brand name or a URL by which one or more of interactive experiences 118 may be located.

Block 606 presents, on a display in which the audiovisual media is being presented, an indication of a selectable interactive experience associated with the brand.

Block 608 receives selection of the selectable interactive experience. This selection may be received through various audio-sensing devices 204.

Block 610 presents the interactive experience. The interactive experience can be presented through a display with or without computational abilities. By way of example, consider a case where an advertisement having a visual fingerprint is presented on a device having computational abilities, such as tablet computer 102-2 of FIG. 2. Assume that tablet computer 102-2 includes local detector 210, interactive experiences 118, and visual fingerprint library 122. Local detector 210, at the beginning of presenting the advertisement, detects a fingerprint in the advertisement. This fingerprint of visual fingerprint library 122 is associated with a corn-chip manufacturer named "Acme" and a brand name of a particular chip named "Cheesy-Os". In response, local detector 210 locates one of interactive experiences 118 associated with the "Cheesy-Os" brand. Local detector 210 installs a web-enabled application effective to present a selectable indicator on the display and during the advertisement.

On selection of the selectable indicator (e.g., through a tap gesture made to the indicator), local detector 210 pauses the advertisement and the accompanying audiovisual program. Local detector 210 then, through the web-enabled application, present information about "Cheesy-Os", enables selection of a coupon for a discount on "Cheesy-Os", enables songs, games, and visual media related to "Cheesy-Os" and so forth. When the interactive experience is complete, local detector 210 resumes play of the audiovisual media program and/or advertisement at or prior the point at which either were paused.

Figure 7:
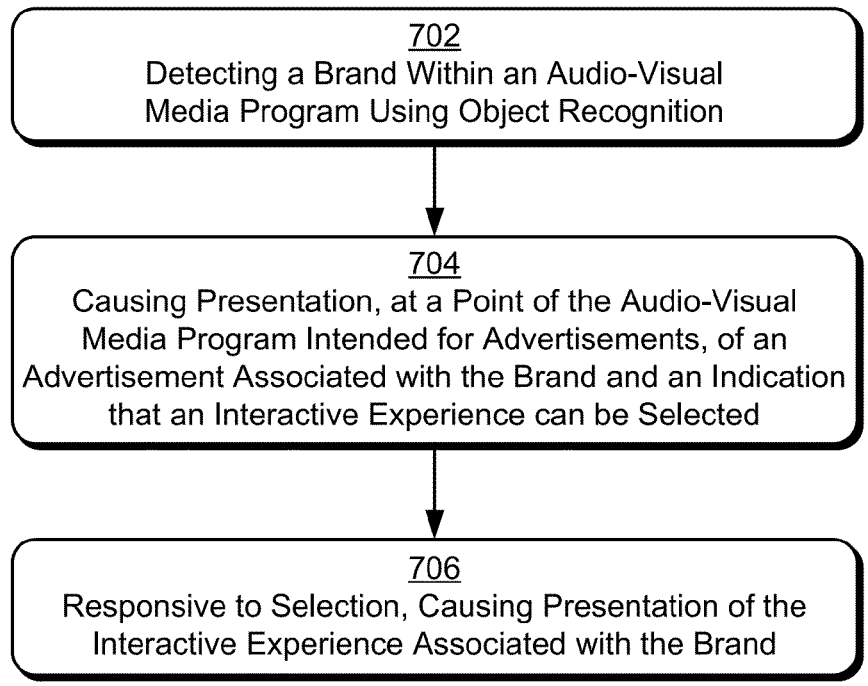
FIG. 7 illustrates example methods brand detection in audiovisual media, including causing presentation of an interactive experience associated with a detected brand.

FIG. 7 depicts methods 700 for brand detection in audiovisual media, including causing presentation of an interactive experience associated with a detected brand. The techniques may perform methods 300, 600, and/or 700, alone or in conjunction with each other, in whole or in part.

Block 702 detects a brand within an audiovisual media program using object recognition of visual aspects of the audiovisual media program against objects associated with brands.

Block 704 causes presentation, at a point of the audiovisual media program allocated for presentation of advertisements, of an advertisement associated with the brand and an indication that an interactive experience associated with the brand can be selected.

Block 706, responsive to selection of the interactive experience, causes presentation of the interactive experience associated with the brand. Note that methods 700 may be performed in whole or in part at a computing device associated with the display or remotely. Thus, in one case local detector 210 acts at a computing device associated with the display, such as through a set-top box, and presents the advertisement and the indication on a display associated with the set-top box. In another case, remote detector 112 acts remote from a display on which the audiovisual media program is caused to be presented and causes presentation by broadcasting the advertisement within the audiovisual media program.

Figure 8:
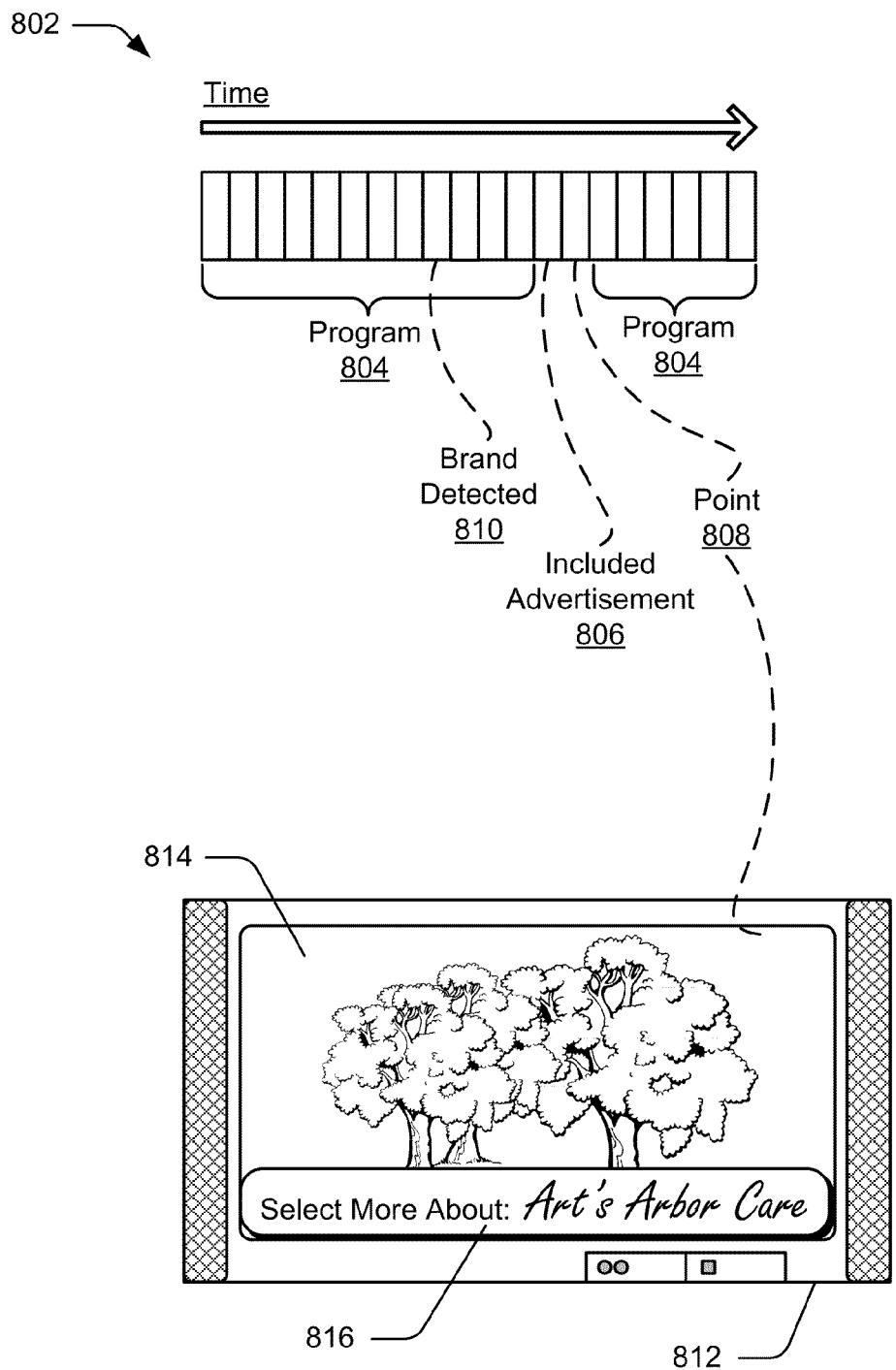
FIG. 8 illustrates an audiovisual presentation timeline.

By way of example, consider FIG. 8, which illustrates an audiovisual presentation timeline 802. This timeline shows portions of the audiovisual media that presents a program 804, an included advertisement 806, and a point intended for advertisements 808 (point 808). Assume that remote detector 112 detects a brand for tree trimming ("Art's Arbor Care") within program 804 at brand detected 810. Remote detector 112 then determines one of brand advertisements 116 of FIG. 1 associated with the detected brand and one of interactive experiences 118 also associated with the detected brand. Remote detector 112 then determines the point in the audiovisual media at which an advertisement is allocated to be shown, here point 808. Point 808 is directly after a portion at which included advertisement 806 is presented and is about three minutes after the brand was detected at brand detected 810. Remote detector 112 then causes the audiovisual media to be broadcast including one of brand advertisements 116 and an indication of one of interactive experiences 118 at point 808 in the timeline 802. This is illustrated in display 812 at brand advertisement 814 and indication 816.

The preceding discussion describes methods relating to detecting a brand in audiovisual media. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1, 2, and 9 (device 900 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., remote detector 112 and local detector 210) represent program code that performs specified tasks when executed on a processor (e.g., processor(s) 108 and/or 206). The program code can be stored in one or more computer-readable memory devices, such as CRM 110 and/or CRM 208 or computer-readable media 914 of FIG. 9.

Example Device

Figure 9:
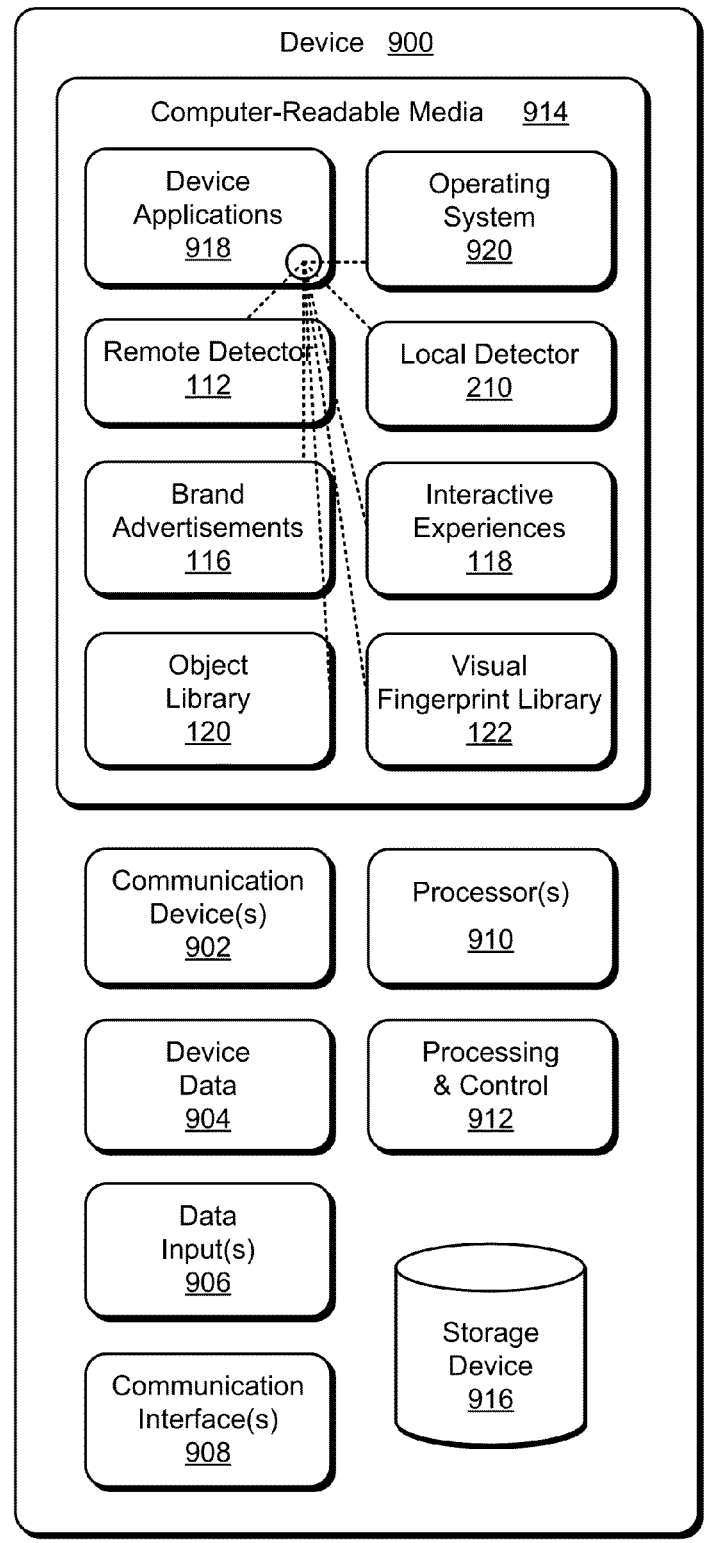
FIG. 9 illustrates an example device in which techniques enabling brand detection in audiovisual media can be performed.

FIG. 9 illustrates various components of example device 900 that can be implemented as any type of client, server, and/or computing device as described with reference to the previous FIGS. 1-8 to implement techniques enabling brand detection in audiovisual media. In some embodiments, device 900 can be implemented as one or a combination of a wired and/or wireless device, as a form of television computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 900 may also be associated with a user (e.g., a person) and/or an entity that operates the device such that a device describes logical devices that include users, software, firmware, and/or a combination of devices.

Device 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device (e.g., audiovisual media 114), and/or information associated with a user of the device. Media content stored on device 900 can include any type of audio, video, and/or image data. Device 900 includes one or more data inputs 906 via which any type of data, media content, and/or inputs can be received, such as human utterances, user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable brand detection in audiovisual media. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable storage media 914 provides data storage mechanisms to store device data 904, as well as various device applications 918 and any other types of information and/or data related to operational aspects of device 900. For example, an operating system 920 can be maintained as a computer application with computer-readable storage media 914 and executed on processors 910. Device applications 918 may include a device manager, such as any form of a control application, software application, signal-processing and control module, code that is native to a particular device, a hardware abstraction layer for a particular device, and so on.

Device applications 918 also include any system components, engines, or modules to implement techniques enabling brand detection in audiovisual media. In this example, device applications 918 can include remote detector 112 and/or local detector 210, brand advertisements 116, interactive experiences 118, object library 120, and visual fingerprint library 122.

Conclusion

Although embodiments of techniques and apparatuses enabling a brand detection in audiovisual media have been described in language specific to features and/or methods, it is to be understood that the subject of the appended claims is not necessarily limited to the specific features or methods described. Rather, the specific features and methods are disclosed as example implementations enabling brand detection in audiovisual media.

What is claimed is:

1. A computer-implemented method comprising:
   detecting a brand within an audiovisual media that has or is going to be broadcast, the detecting comprising:
      recognizing an audio or visual aspect within the audiovisual media; and
      identifying the brand from one or more brands by comparing the audio or visual aspect to audio or visual fingerprints associated with the one or more brands; and
   presenting, on a display in which the audiovisual media is being presented, an advertisement associated with the brand or an indication of a selectable interactive experience associated with the brand.

2. A computer-implemented method as described in claim 1, wherein detecting the brand within the audiovisual media is performed in real-time, at a computing device associated with the display, and immediately after receiving the audiovisual media broadcast from a remote entity and at the computing device.

3. A computer-implemented method as described in claim 1, wherein detecting the brand within the audiovisual media is performed at an entity remote from the display and prior to the audiovisual media being broadcast, and wherein presenting the advertisement or the indication broadcasts the advertisement or the indication to a computing device associated with the display.

4. A computer-implemented method as described in claim 1, wherein the audiovisual media is broadcast through radio, satellite, or wired cable.

5. A computer-implemented method as described in claim 1, wherein the brand is a symbol, logo, trademark, or jingle associated with a product or service.

6. A computer-implemented method as described in claim 1, wherein recognizing the audio or visual aspect recognizes a person using facial recognition and
   presenting the advertisement or the indication presents the advertisement associated with the person or, responsive to selection of the indication, presents the selectable interactive experience associated with the person.

7. A computer-implemented method as described in claim 1, wherein detecting the brand uses voice-recognition to recognize the audio aspect within the audiovisual media.

8. A computer-implemented method as described in claim 1, wherein detecting the brand includes performing object recognition to recognize the visual aspect within the audiovisual media.

9. A computer-implemented method as described in claim 8, wherein performing object recognition is performed over multiple frames in the audiovisual media.

10. A computer-implemented method as described in claim 8, wherein performing the object recognition:
    determines that some visual aspects recognized in the audiovisual media have a low probability of being identified as one the visual fingerprints; and
    forgoes comparing the low-probability visual aspects.

11. A computer-implemented method as described in claim 1, further comprising determining that the brand is within an advertisement associated with the brand and wherein presenting the advertisement or the indication presents the indication responsive to determining that the brand is within the advertisement associated with the brand.

12. A computer-implemented method as described in claim 1, wherein presenting the advertisement associated with the brand or the indication presents the indication and further comprising:
    receiving selection of the selectable interactive experience; and
    responsive to receiving the selection, presenting an interactive experience associated with the brand.

13. A computer-implemented method as described in claim 1, wherein the brand is determined to be within an advertisement associated with the brand and further comprising storing the visual fingerprint associated with the advertisement effective to more-quickly determine the brand when receiving the advertisement.

14. A computer-implemented method comprising:
    receiving an advertisement that is within an audiovisual media program;
    detecting an audio or visual fingerprint in the advertisement, the audio or visual fingerprint based on a brand detected within a previous iteration of the advertisement;
    presenting, on a display in which the audiovisual media is being presented, an indication of a selectable interactive experience based on the audio or visual fingerprint associated with the brand;
    receiving selection of the selectable interactive experience; and
    presenting the interactive experience.

15. A computer-implemented method as described in claim 14, wherein the advertisement is received via streaming or from stored content.

16. A computer-implemented method as described in claim 14, wherein detecting the audio or visual fingerprint is performed by comparing audio or visual aspects of the advertisement with a database of audio and visual fingerprints, the fingerprints associated with brands and indicating associated interactive experiences.

17. A computer-implemented method as described in claim 14, wherein presenting the interactive experience pauses the audiovisual media and, when the interactive experience is complete, restarts the audiovisual media at or prior to a point at which the audiovisual media was paused.

18. A computer-implemented method comprising:
    detecting a brand within an audiovisual media program using voice or object recognition of audio or visual aspects in the audiovisual media, the detecting including identifying the brand from one or more brands by comparing the audio or visual aspect to audio or visual fingerprints associated with the one or more brands;
    causing presentation, at a point of the audiovisual media program allocated for presentation of advertisements, of an advertisement associated with the brand and an indication that an interactive experience associated with the brand can be selected; and
    responsive to selection of the interactive experience, causing presentation of the interactive experience associated with the brand.

19. A computer-implemented method as described in claim 18, wherein detecting the brand is performed at a computing device associated with a display and causing presentation presents the advertisement and the indication on the display associated with the computing device.

20. A computer-implemented method as described in claim 18, wherein detecting the brand is performed at a remote computing device remote from a display on which the audiovisual media program is caused to be presented and wherein causing presentation broadcasts the advertisement within a broadcast of the audiovisual media program.

* * * * *